US005617379A

United States Patent [19]
Shinozaki et al.

[11] Patent Number: 5,617,379
[45] Date of Patent: Apr. 1, 1997

[54] MAGNETO-OPTICAL DISK APPARATUS UTILIZING A LEAKAGE MAGNETIC FIELD FROM A MAGNETIC DRIVING MECHANISM

[75] Inventors: Shimpei Shinozaki; Suguru Takishima; Hiroshi Yamamoto, all of Tokyo, Japan

[73] Assignee: Asahi Kogaku Kogyo Kabushiki Kaisha, Tokyo, Japan

[21] Appl. No.: 522,088

[22] Filed: Aug. 31, 1995

[30] Foreign Application Priority Data

Sep. 1, 1994 [JP] Japan .................................. 6-230189
Sep. 1, 1994 [JP] Japan .................................. 6-230190

[51] Int. Cl.$^6$ ........................................................ G11B 11/00
[52] U.S. Cl. ........................................ 369/13; 360/114
[58] Field of Search ............................. 369/13, 14, 110; 360/114, 59, 103, 102, 46; 365/121, 122

[56] References Cited

U.S. PATENT DOCUMENTS

| | | | |
|---|---|---|---|
| 4,672,594 | 6/1987 | Kato et al. | 369/13 |
| 4,748,606 | 5/1988 | Naito et al. | 369/13 |
| 5,093,816 | 3/1992 | Taniguchi et al. | 369/13 |
| 5,220,544 | 6/1993 | Kikuchi et al. | 369/13 |
| 5,226,030 | 7/1993 | Konno | 369/110 |
| 5,291,345 | 3/1994 | Umeda et al. | 369/13 |
| 5,367,508 | 11/1994 | Haba | 369/13 |
| 5,502,693 | 3/1996 | Okamoto et al. | 369/13 |

FOREIGN PATENT DOCUMENTS 0222916 5/1987 European Pat. Off. .
0290281 11/1988 European Pat. Off. .

OTHER PUBLICATIONS

Patent Abstracts of Japan, vol. 18, No. 89 (P-1692), Feb. 14, 1994 (JP-A-52-90423).

*Primary Examiner*—Tan Dinh
*Attorney, Agent, or Firm*—Sughrue, Mion, Zinn, Macpeak & Seas

[57] ABSTRACT

A magneto-optical disk is provided wherein a magnetic field generated by a pair of rod-shaped permanent magnets of linear motor mechanisms for moving an optical head leaks to cover an external magnetic field generating device. The rod-shaped permanent magnets are arranged such that the leakage magnetic field is generally parallel with a data recording surface of a magneto-optical disk. In the external magnetic field generating device, the leakage magnetic field causes a permanent magnet to be oriented such that its permanent magnetization is directed parallel to the data recording surface, which is a neutral state. In a recording or erasing operation, a magnetic field reversing coil is energized to cause the permanent magnet to make a quarter rotation (in opposite directions for the recording and erasing operations) from the neutral state so that pole S or N faces the data recording surface.

11 Claims, 10 Drawing Sheets

MAGNETO-OPTICAL DISK APPARATUS UTILIZING A LEAKAGE MAGNETIC FIELD FROM A MAGNETIC DRIVING MECHANISM

BACKGROUND OF THE INVENTION

The present application is based on and claims priorities from Japanese Patent Application Nos. Hei. 6-230189 and Hei. 6-230190 both filed Sep. 1, 1994, the disclosures of which are incorporated by reference herein.

The present invention relates to a magneto-optical disk apparatus and, more specifically, to a magneto-optical disk apparatus having an external magnetic field generating device for applying magnetic fields to a magneto-optical disk in different directions in recording and erasing data onto and from it.

It is known that in a magneto-optical disk apparatus, data recording and erasure are effected by changing the direction of magnetization in a magneto-optical disk by heating a portion thereof with laser light or the like while applying a magnetic field to it. For example, as shown FIG. 1A, in when a magneto-optical disk DISK is uniformly magnetized downward, if a certain portion of the magneto-optical disk DISK is heated to a temperature higher than a prescribed temperature (Curie point) by causing an optical pickup 101 to illuminate that portion with laser light L while an upward external magnetic field $H_x$ is generated by an external magnetic field generating device 100, the direction of magnetization at the heated portion is changed to the upward direction due to the external magnetic field $H_x$. As a result, the magnetization direction at this portion is made different from that at the other portions. In this manner, data can be recorded in the form of magnetizations having respective directions.

To erase recorded data, as shown in FIG. 1B, a recorded portion is heated by illumination with laser light L in the same manner as in the above while a downward external magnetic field $H_x$ is applied to the magneto-optical disk DISK by the external magnetic field generating device 100. As a result, the magnetization direction at the heated portion is changed to the downward direction, i.e., equal to that at the other portions, which means data erasure.

Since, as described above, the magneto-optical disk apparatus needs external magnetic fields in different directions for data recording and erasure, various conventional devices for reversing the external magnetic field have been proposed. For example, Japanese Examined Patent Publication No. Hei. 5-60162 discloses a configuration schematically shown in FIG. 2. A permanent magnet 200 for applying an external magnetic field to a magneto-optical disk DISK is so supported as to be rotatable about a shaft in an eccentric manner. The permanent magnet 200 is rotated by 180° by reversing the direction of a current flowing through a coil 201 that surrounds the permanent magnet 200, in which a repulsive force due to magnetic fields of the permanent magnet 200 and the coil 201 is utilized. As a result, the direction of the external magnetic field $H_x$ applied to the magneto-optical disk DISK by the permanent magnet 200 is reversed. In this manner, data is recorded and erased by means of external magnetic fields in the respective directions. Reference numeral 202 denotes an optical pickup device.

However, the technique proposed in the above publication involves a physical operation of rotating the permanent magnet about the shaft when the direction of the external magnetic field is reversed. In particular, in the above example, it is necessary to rotate the permanent magnet by 180° (half rotation). The rotation takes time, during which neither data recording nor erasure can be performed on the magneto-optical disk. That is, being restricted by the physical operation time of the permanent magnet, the access time of data recording and erasure cannot be shortened.

From the viewpoint of access time, a configuration would be advantageous in which the external magnetic field generating device is implemented by a coil and the direction of the external magnetic field is reversed by switching the direction of a current flowing though the coil. However, this configuration consumes more electric power than the configuration using the permanent magnet, because a relatively large current needs to flow through the coil.

Further, in the technique proposed in the above publication, the orientation of the poles of the permanent magnet for generating the external magnetic field is set by the magnetic force acting between the permanent magnet and the coil. Therefore, it is necessary to energize the coil when rotating the magnetic field by 180° to reverse the direction of the external magnetic field, and when holding the permanent magnet with its poles oriented in either way to apply an upward or downward external magnetic field to the magneto-optical disk. That is, the coil needs to be energized all the time. Therefore, not only is power consumption is large but also heat generation from the coil is not negligible, which will make the magneto-optical disk apparatus more complex or increase its size due to, for instance, the necessity of adding a heat dissipation structure.

SUMMARY OF THE INVENTION

An object of the present invention is to provide a magneto-optical disk apparatus having an external magnetic field generating device that can shorten the access time of the magneto-optical disk apparatus by reducing the rotation time of a permanent magnet for generating an external magnetic field.

Another object of the invention is to provide a magneto-optical disk apparatus which can reduce the accumulated power consumption in a coil that is energized when a permanent magnet for generating an external magnetic field is rotated or held, thereby suppressing heat generation from the coil.

According to the invention, there is provided a magneto-optical disk apparatus for recording and erasing data onto and from a magneto-optical disk that stores data by magnetization perpendicular to a data recording surface thereof, comprising:

an optical pickup including an optical head and a magnetic driving mechanism for moving the optical head along a radial direction of the magneto-optical disk; and an external magnetic field generating device for applying, to the magneto-optical disk, an external magnetic field perpendicular to the data recording surface, the external magnetic field generating device including:

a rotatably mounted permanent magnet which is oriented in a predetermined direction by a leakage magnetic field of the magnetic driving mechanism; and means for generating a magnetic field for changing orientation of the rotatably mounted permanent magnet.

In the above configuration, the rotatably mounted permanent magnet may be so oriented that a permanent magnetization thereof is directed parallel with the data recording surface by the leakage magnetic field which is generally parallel with the data recording surface, and the magnetic field generating means may selectively generate first and second magnetic fields for orienting the rotatably mounted permanent magnet so that poles S and N thereof respectively face the data recording surface.

Alternatively, the rotatably mounted permanent magnet may be so oriented that a permanent magnetization thereof is directed perpendicularly to the data recording surface by the leakage magnetic field which is generally perpendicular to the data recording surface, and the magnetic field generating means may generate a magnetic field for causing the rotatably mounted permanent magnet to make a half rotation to thereby reverse the orientation thereof.

DESCRIPTION OF THE PREFERRED EMBODIMENTS

Embodiments of the present invention will be hereinafter described with reference to the accompanying drawings.
Embodiment 1

Figure 1A:
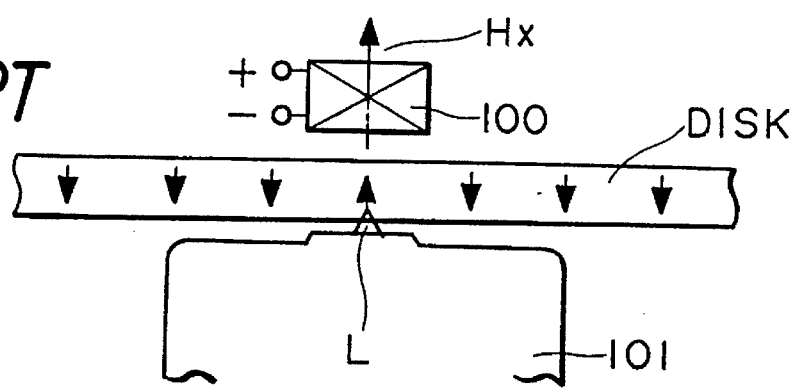
FIGS. 1A and 1B schematically illustrate recording and erasing operations on a magneto-optical disk apparatus.
Figure 1B:
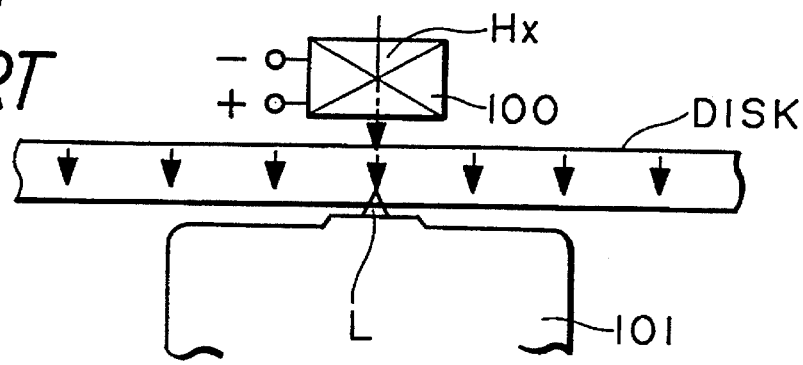
Figure 2:
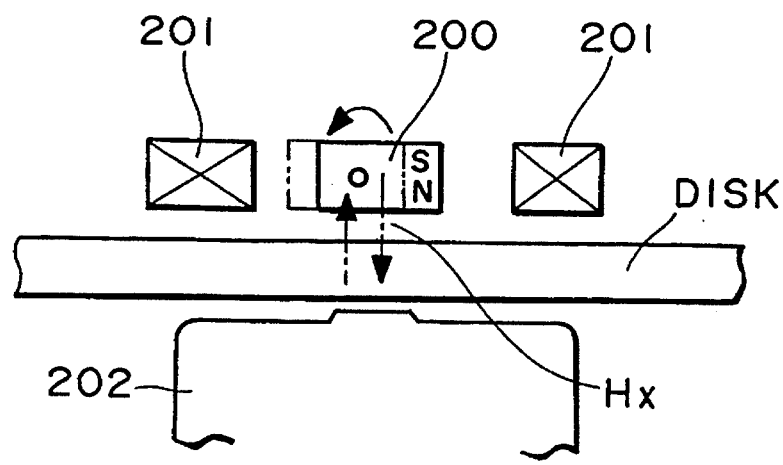
FIG. 2 is a schematic sectional view showing an example of a conventional external magnetic field reversing device.
Figure 3:
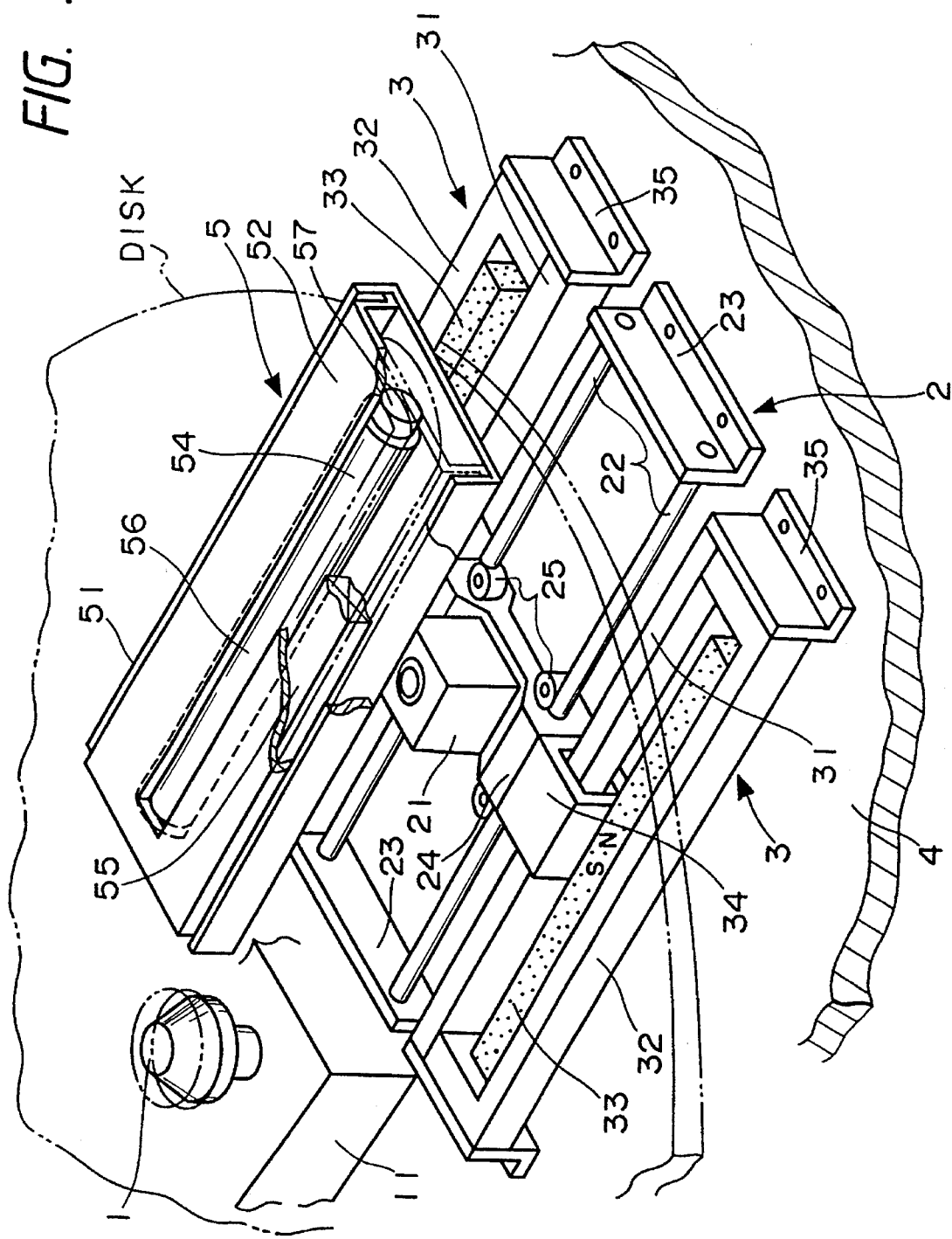
FIG. 3 is a schematic perspective view showing a configuration of a magneto-optical disk apparatus according to a first embodiment of the invention.
Figure 4:
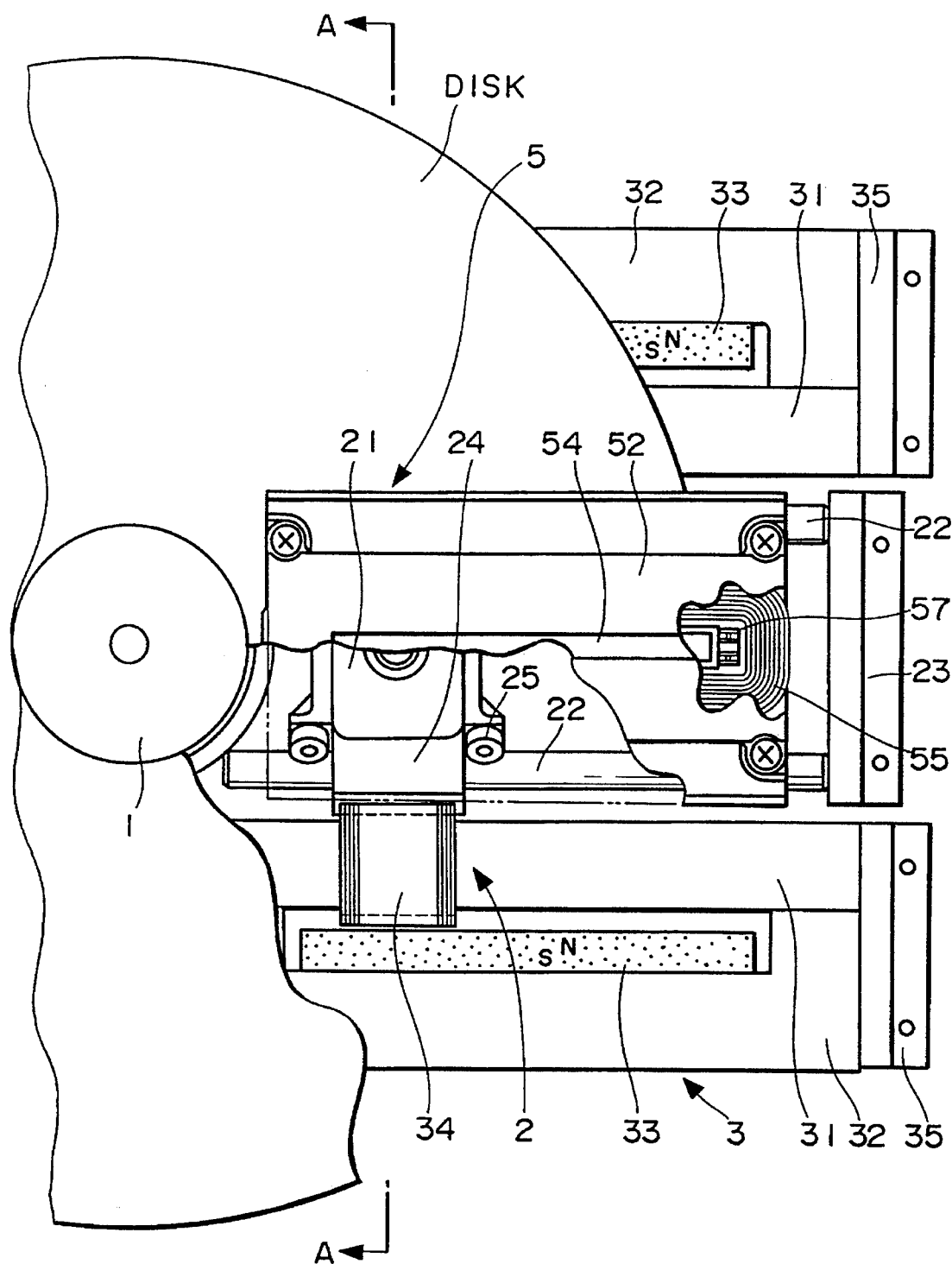
FIG. 4 is a partially broken plan view corresponding to FIG. 3.
Figure 5:
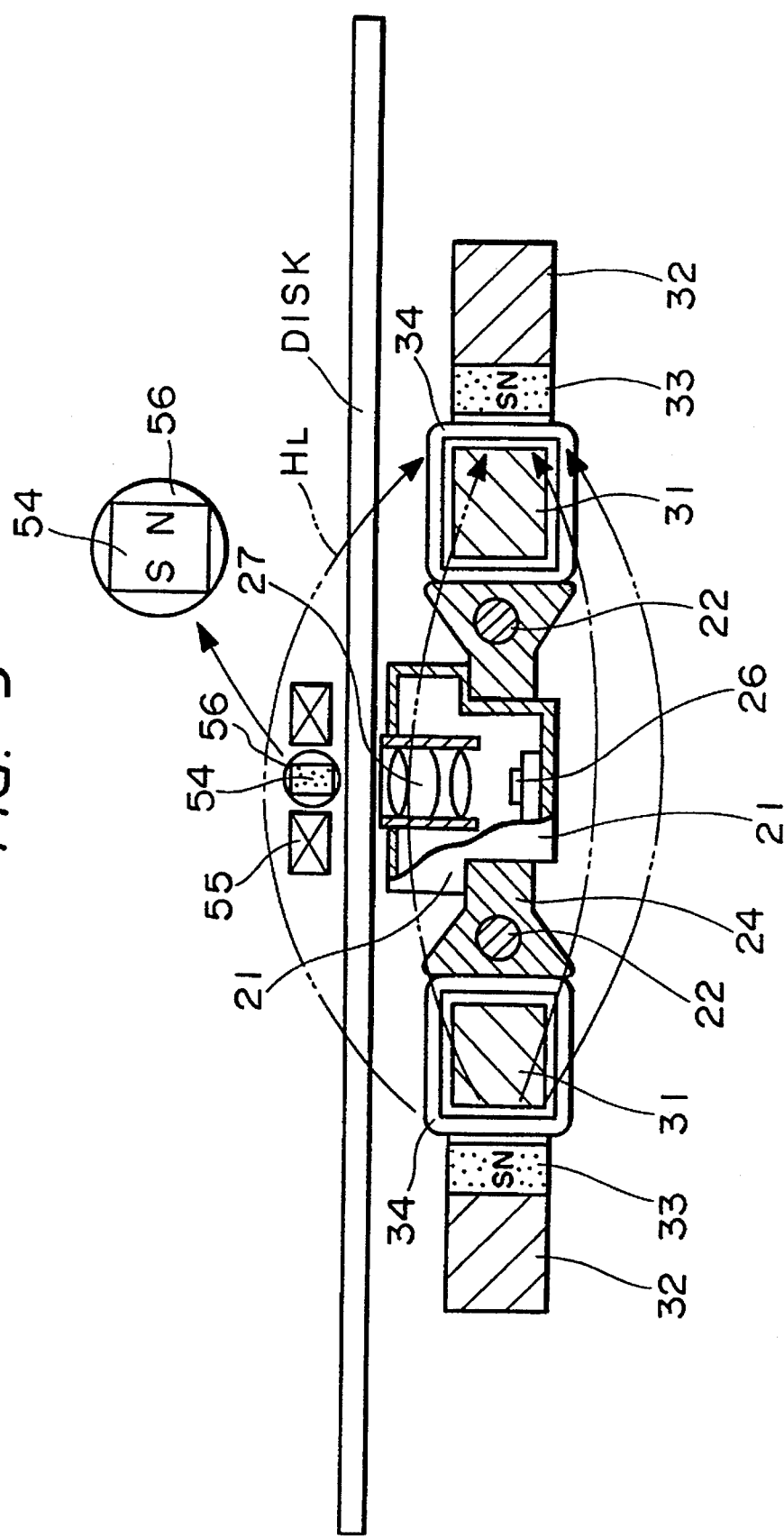
FIG. 5 is a sectional view taken along line A—A in FIG. 4.

FIG. 3 is a schematic perspective view showing a configuration of a magneto-optical disk apparatus according to a first embodiment of the invention. FIG. 4 is a partially broken plan view corresponding to FIG. 3. FIG. 5 is a sectional view taken along line A—A in FIG. 4.

A magneto-optical disk DISK is mounted on a rotary driving portion 1. As the rotary driving portion 1 is rotated by a rotating mechanism 11 having a motor (not shown) as a drive source, the magneto-optical disk DISK is rotated at high speed. An optical pickup 2 has, under the bottom surface of the magneto-optical disk DISK, a magnetic driving mechanism, i.e., linear motor mechanisms 3 in this embodiment, that extends along the radial direction of the magneto-optical disk DISK from the vicinity of the rotary driving portion 1 to the outside end portion of the disk. Thus, an optical head 21 can be reciprocated along the radial direction.

More specifically, in the optical pickup 2, under the bottom data-recording surface of the magneto-optical disk DISK, a pair of parallel, rod-shaped guide rails 22 longer than the radius of the magneto-optical disk DISK extend along the radial direction. The guide rails 22 are fixed to and supported by a base 4 of the magneto-optical disk apparatus through support members 23 provided at both ends of the guide rails 22. The guide rails 22 are inserted into respective sliders 24, which are supported by rollers 25 that roll on the guide rails 22. In this manner, the sliders 24 are so supported as to be capable of reciprocal movement along the guide rails 22. The optical head 21 is mounted on the sliders 24. In this embodiment, a laser element 26 and an optical system 27 are provided in the optical head 21 in an integral manner. Although the optical head 21 is not described in detail here, it is so constructed that laser light emitted from the laser element 26 is focused by the optical system 27 so as to illuminate a very small region of the bottom surface of the magneto-optical disk DISK, to thereby heat that region to a prescribed temperature.

Linear motor mechanisms 3 are disposed outside the respective guide rails 22, and cause the optical head 21 to move reciprocally along the guide rails 22. Each linear motor mechanism 3 is composed of a central yoke 31 that is disposed outside the guide rail 22 and extends parallel with it, a back yoke 32 integral with the central yoke 31, a permanent magnet 33 that is fixed to the back yoke 32 so as to extend along the central yoke 31, and a coil 34 that is attached to the slider 24 so as to loosely surround the central yoke 31. The yokes 31 and 32 are fixed to and supported by the base 4 through support members 35.

In the linear motor mechanisms 3, when the coils 34 are energized in a magnetic field formed by the permanent magnets 33 and the yokes 31 and 32, magnetic driving forces are exerted on the coils 34 in accordance with the energizing direction. By controlling the amounts and directions of currents flowing through the coils 34, the coils 34 and the sliders 24 and optical head 21 that are integral with the coils 34 can be moved along the guide rails 22, or stopped at an arbitrary position. Since the permanent magnets 33 are so disposed that poles S and N of the respective permanent magnets 33 are arranged in the horizontal direction alternately as shown in FIG. 5, the yokes 31 and 32 and the permanent magnets 33 form a magnetic field $H_L$ indicated by two-dot chain lines in FIG. 5 in a space including the guide rails 22 and the optical head 21.

Figure 6:
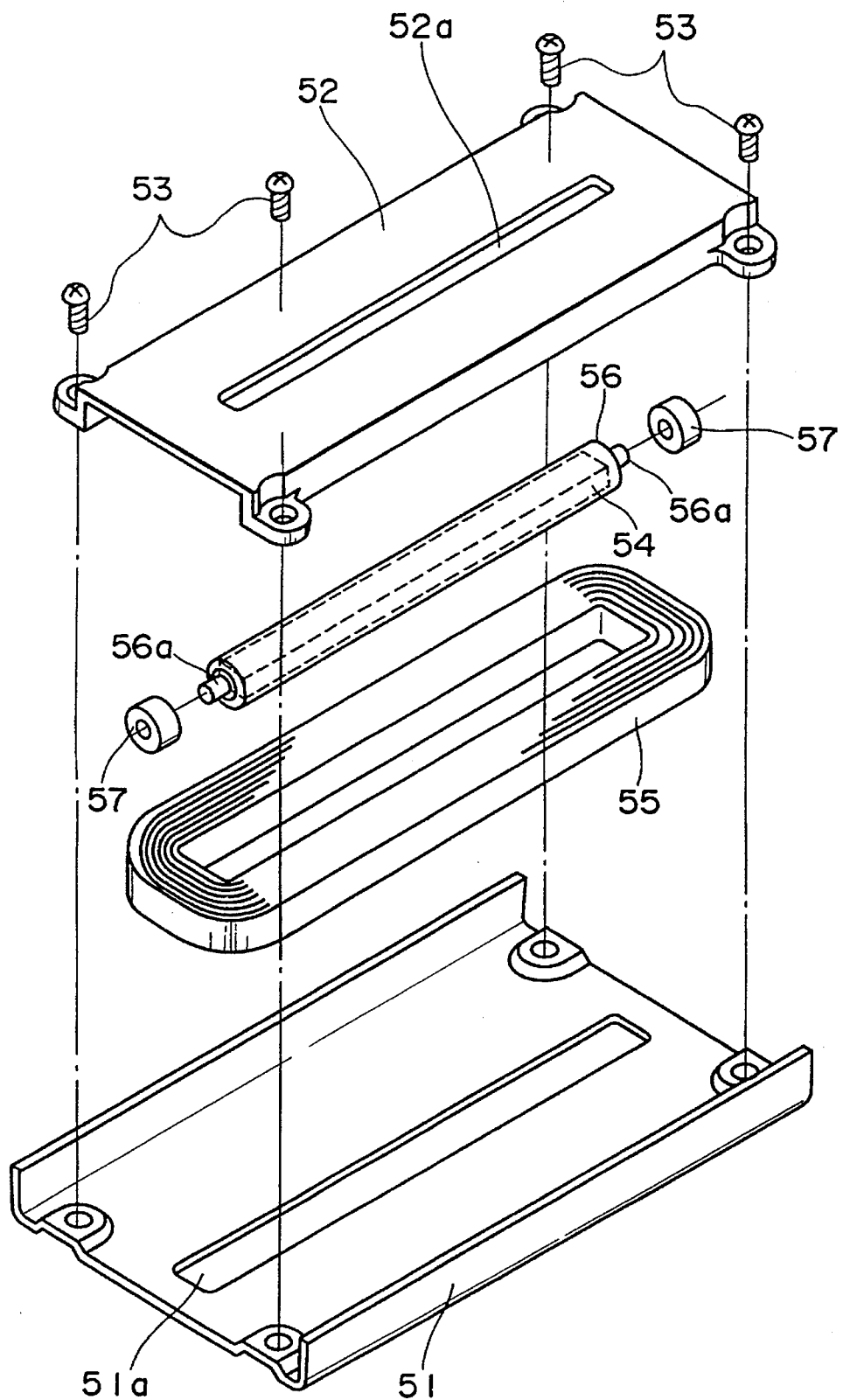
FIG. 6 is an exploded perspective view of an external magnetic field generating device.

In the region over the magneto-optical disk DISK, an external magnetic field generating device 5 extends along the radial direction of the magneto-optical disk DISK over the entire radius so as to be opposed to the optical pickup 2. As shown in an exploded perspective view of FIG. 6, in the external magnetic field generating device 5, a base plate 51 and a cover plate 52 that extend over the magneto-optical disk DISK are fastened together with screws 53 to constitute a thin casing, which contains an external magnetic field generating permanent magnet 54 and a magnetic field reversing coil 55. Although not illustrated in FIG. 6, the external magnetic field generating device 5 is supported by an opening/closing lid or a top base of the magneto-optical disk apparatus.

Openings 51a and 52a are formed in the base plate 51 and the cover plate 52 so as to extend along the radial direction of the magneto-optical disk DISK. The external magnetic field generating permanent magnet 54 assuming a long and narrow rectangular pole is supported so as to extend over the entire radius of the magneto-optical disk and face the openings 51a and 52a. The openings 51a and 52a and the external magnetic field generating permanent magnet 54 are so located as to face the locus of the radial movement of the optical head 21 of the optical pickup 2. The external magnetic field generating permanent magnet 54 has a rectangular cross-section taken perpendicularly to its longitudinal direction, and poles S and N exist at its longer sides of the cross-section. The external magnetic field generating permanent magnet 54 is coated with a resin holding member 56 having a circular cross-section, and shafts 56a axially extending from both ends of the holding member 56 are axially supported by the inner surface of the cover plate 52 through respective bearings 57. In this manner, the external magnetic field generating permanent magnet 54 is rotatable on its axis together with the holding member 56, in other words, rotatable with the shafts 56a as a horizontal axis of rotation.

Further, the magnetic field reversing coil 55 is provided in the casing so as to surround the external magnetic field generating permanent magnet 54 in a horizontal plane, and fixed and supported between the base plate 51 and the cover plate 52. The magnetic field reversing coil 55 is energized by a control circuit (not shown). In particular, the coil 55 is so controlled that the energizing directions are opposite during data recording and erasure, and that energizing is not effected during the other operations such as data reading.

Figure 7A:
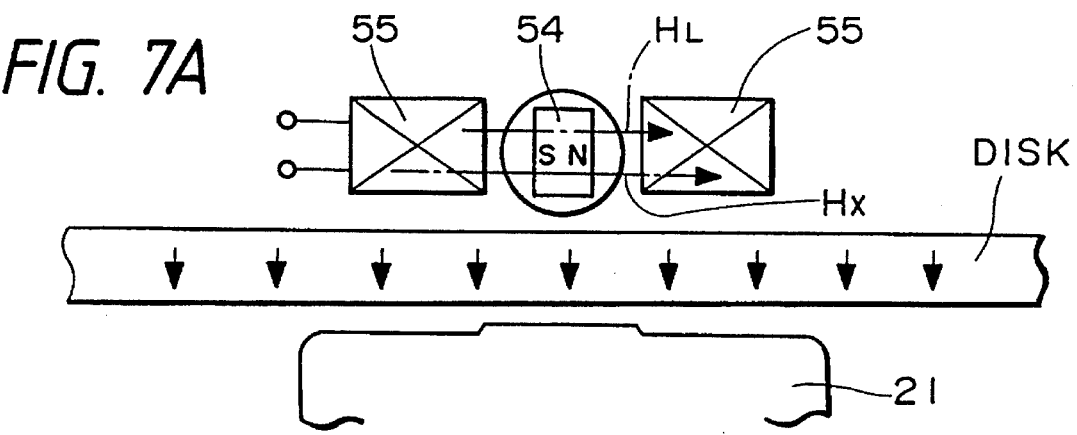
FIGS. 7A–7C are schematic sectional views illustrating external magnetic field reversing operations.

In the magneto-optical disk apparatus having the above configuration, it is now assumed that the magneto-optical disk DISK is magnetized downward in advance as shown in FIG. 7A, and that the magneto-optical disk DISK is set on the rotary driving portion 1 and is in a rotatable state. In this state, part of the magnetic field generated by the permanent magnets 33 of the linear motor mechanisms 3 that are provided in the optical pickup 2 leaks out of the optical pickup 2 through the magneto-optical disk DISK to form a leakage magnetic field $H_L$, which is generally parallel to the data recording surface and covers the region where the external magnetic field generating device 5 is provided. Therefore, in the external magnetic field generating device 5, when the magnetic field reversing coil 55 is not energized, the leakage magnetic field $H_L$ exerts magnetic force on the external magnetic field generating permanent magnet 54. As a result, the permanent magnet 54 is rotated so that its poles S and N are oriented in the direction of the leakage magnetic field $H_L$, i.e., in the horizontal direction; that is, the permanent magnet 54 assumes a neutral position of rotation. In other words, the external magnetic field $H_X$ generated by the external magnetic field generating permanent magnet 54 is not applied to the magneto-optical disk DISK perpendicularly thereto.

Figure 7B:
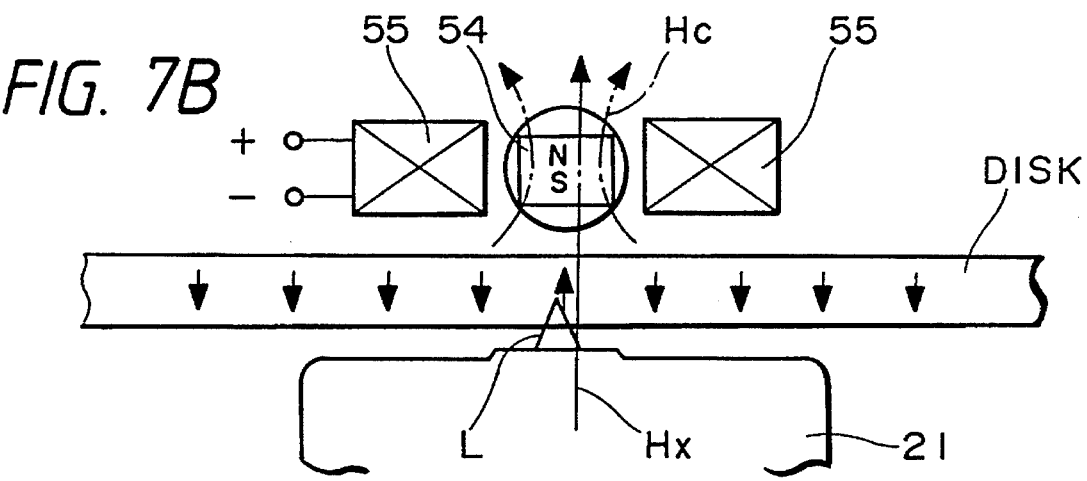
Figure 7C:
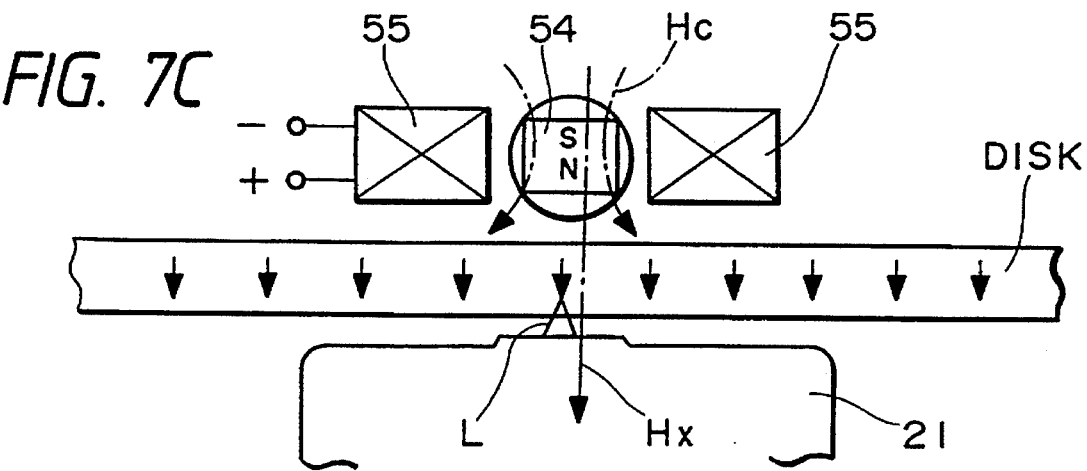

In this state, if the magnetic field reversing coil 55 is energized in one direction as shown in FIG. 7B, a magnetic field $H_C$ is generated by the coil 55. Since the strength of this magnetic field $H_C$ and that of the leakage-magnetic field $H_L$ have a relationship $H_C > H_L$, the external magnetic field generating permanent magnet 54 is more influenced by the magnetic field $H_C$ of the magnetic field reversing coil 55. As a result, the external magnetic field generating permanent magnet 54 makes a quarter counterclockwise rotation (see FIG. 7B) with the shafts 56a serving as the rotation axis, so that poles S and N are oriented perpendicularly to the data recording surface of the magneto-optical disk DISK. Thus, an external magnetic field $H_X$ for causing upward magnetization is applied to the magneto-optical disk DISK by the external magnetic field generating permanent magnet 54.

On the other hand, in the optical pickup 2, when the coils 34 of the linear motor mechanisms 3 are supplied with a prescribed current, the linear motor action causes the optical head 21 to move along the guide rails 22 to reach a prescribed radial position of the magneto-optical disk DISK. At this position, the optical head 21 focuses laser light L and applies it to the surface of the magneto-optical disk DISK, so that at the illuminated portion the magnetization direction is changed to the upward direction. Thus, data can be recorded onto the magneto-optical disk DISK. If the energization of the magnetic field reversing coil 55 is stopped upon completion of the data recording, only the leakage magnetic field $H_L$ acts on the external magnetic field generating permanent magnet 54. Therefore, the external magnetic field generating permanent magnet 54 makes a quarter rotation to return to the state of FIG. 7A.

When the magnetic field reversing coil 55 is energized in the direction opposite to that of the above case and the direction of the magnetic field $H_C$ generated by the coil 55 is thereby reversed from the above case, the external magnetic field generating permanent magnet 54 makes a quarter clockwise rotation with the shafts 56a serving as the rotation axis. As a result, poles S and N are oriented vertically with their locations reverse to those in the above case. Therefore, an external magnetic field $H_X$ for causing downward magnetization is applied to the magneto-optical disk DISK by the external magnetic field generating permanent magnet 54. In this state, if the optical head 21 is moved by the linear motor mechanisms 3 to a position where data is recorded (the magnetization direction is upward) and then applies laser light L to that portion, the magnetization direction at that portion is changed to the downward direction, that is, data is erased from the magneto-optical disk DISK.

In summary, in the external magnetic field generating device 5, the external magnetic field generating permanent magnet 54 is usually held in a neutral state. During data recording or erasure, the permanent magnet 54 makes a quarter rotation in the counterclockwise or clockwise direction from the neutral state, to generate an external magnetic field for data recording or erasure. Therefore, the rotation angle of the external magnetic field generating permanent magnet 54 when it is changed from the neutral state to the recording or erasing state can be halved from the rotation angle of the conventional configuration disclosed in the above-mentioned publication No. Hei. 5-60162. Since the access time can also be halved, the above configuration can realize higher speed accessing in the magneto-optical disk apparatus.

In the above configuration, the external magnetic field generating permanent magnet 54 is held in the neutral state by utilizing the leakage magnetic field $H_L$ of the permanent magnets 33 of the linear motor mechanisms 3. Since the leakage magnetic field $H_L$ is weak, the external magnetic field generating permanent magnet 54 can be rotated by generating the magnetic field $H_C$, which is stronger than the leakage magnetic field $H_L$, by causing a very small current to flow through the magnetic field reversing coil 55. Therefore, the power consumption in the magnetic field reversing coil 55 is very small.

Embodiment 2

The second embodiment has a configuration similar, in many aspects, to that of the first embodiment, and the following description will be mainly directed to differences between the two embodiments.

Figure 8:
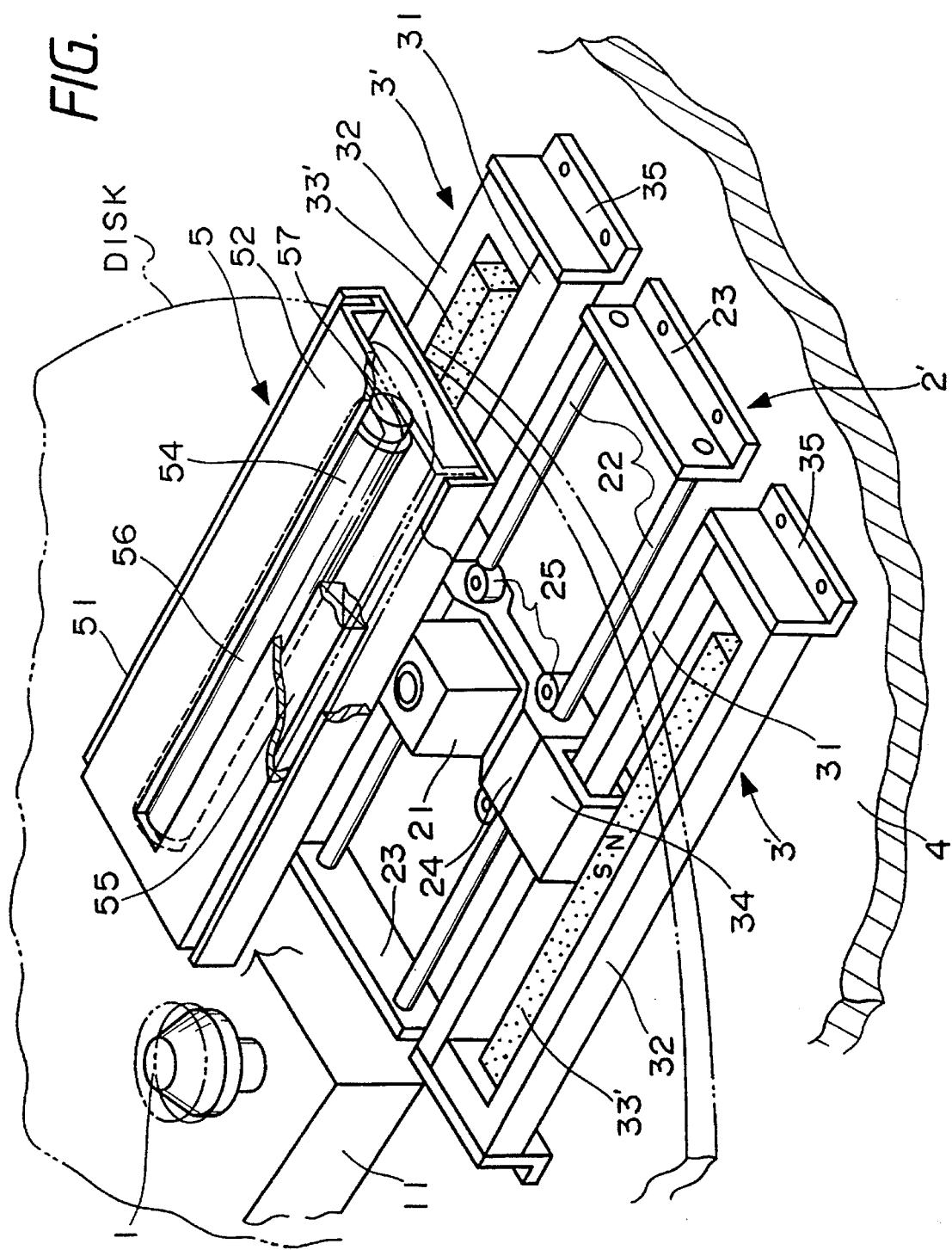
FIG. 8 is a schematic perspective view showing a configuration of a magneto-optical disk apparatus according to a second embodiment of the invention.
Figure 9:
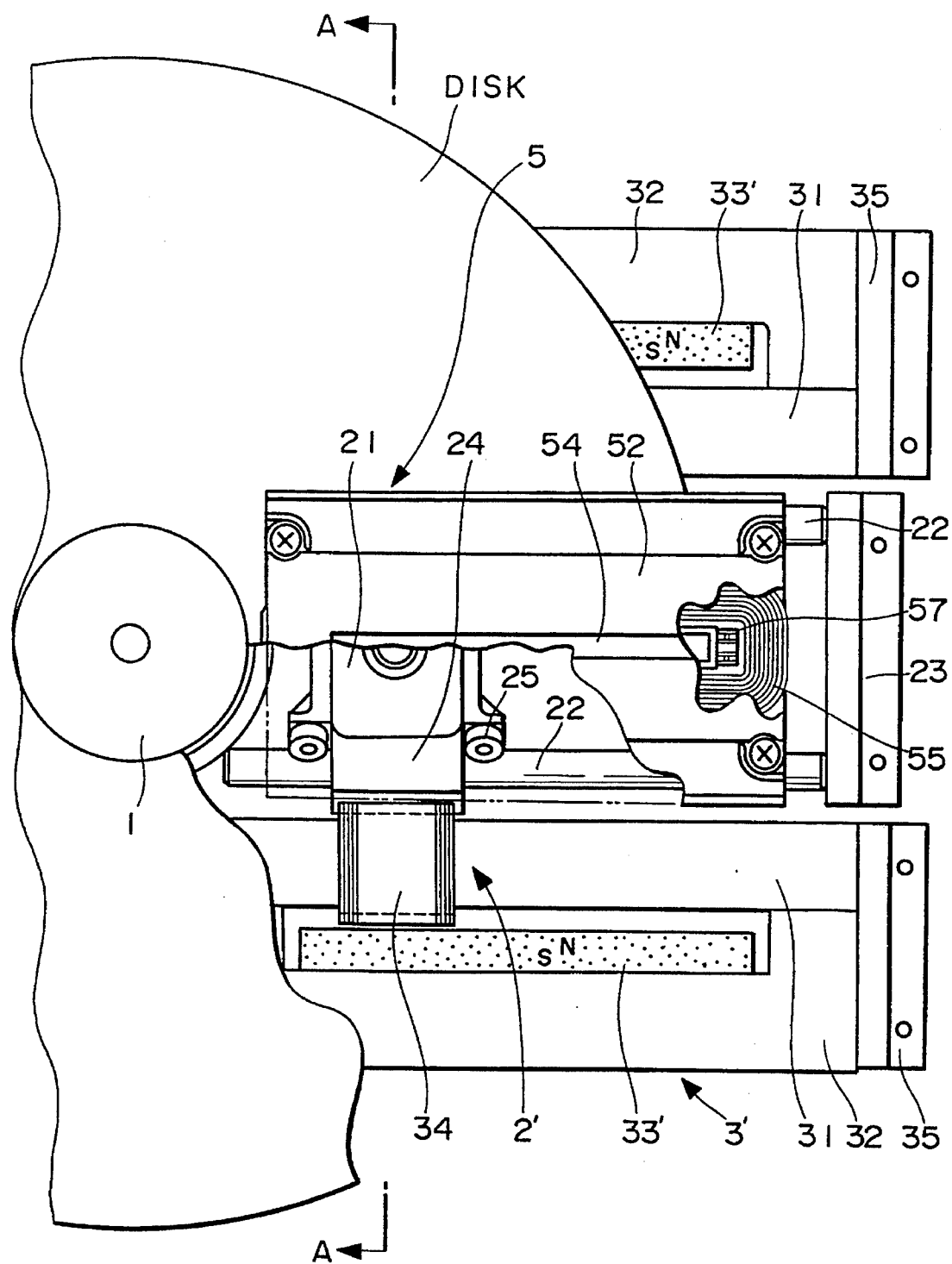
FIG. 9 is a partially broken plan view corresponding to FIG. 8.
Figure 10:
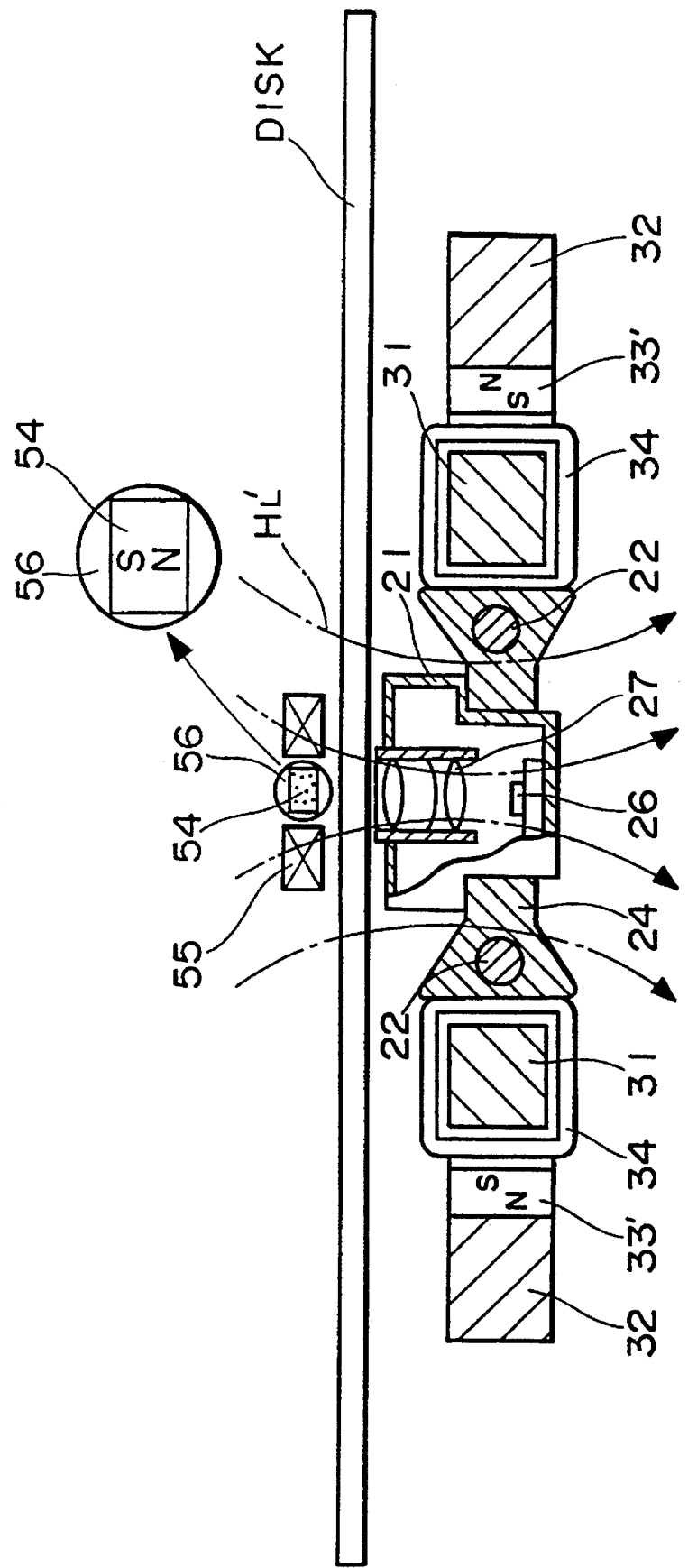
FIG. 10 is a sectional view taken along line A—A in FIG. 9.

FIGS. 8–10 respectively correspond to FIGS. 3–5 that have been used to describe the first embodiment. Referring to FIG. 8, in linear motor mechanisms 3' of an optical pickup 2', permanent magnets 33' are so disposed that poles S or poles N of those permanent magnets 33' are opposed to each other in the horizontal direction. In this embodiment, poles S are opposed to each other. As a result, the permanent magnets 33' and the yokes 31 and 32 form a magnetic field $H_L'$ indicated by chain lines in FIG. 10 in a space including the guide rails 22 and the optical head 21.

An external magnetic field generating device 5 has the same configuration as that of the first embodiment (see FIG. 6), but a magnetic field reversing coil 55 is energized by a control circuit (not shown) in a different manner. More specifically, the magnetic field reversing coil 55 is energized in one direction during data recording onto the magneto-optical disk DISK, while it is not energized during data erasure.

Figure 11A:
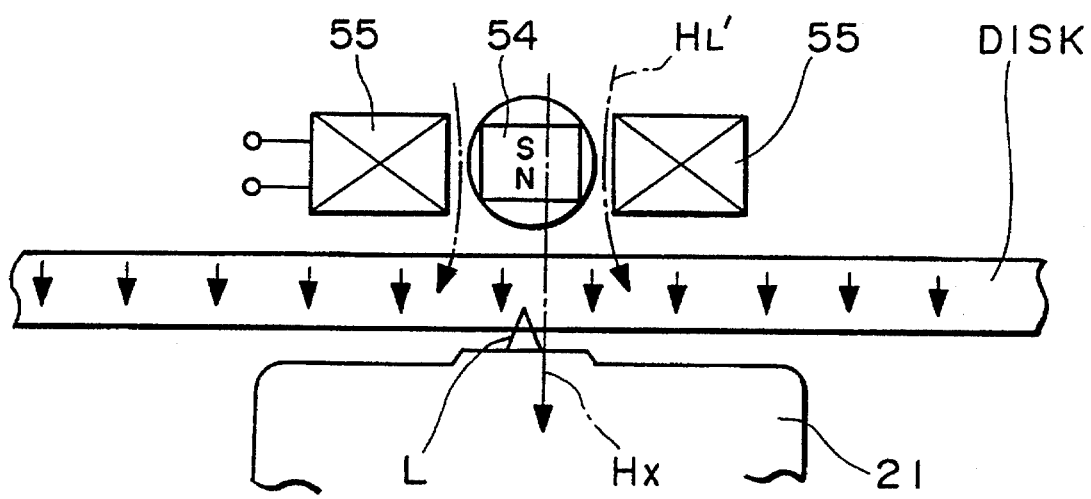
FIGS. 11A and 11B are schematic sectional views illustrating an external magnetic field reversing operation.

In the magneto-optical disk apparatus of this embodiment, it is now assumed that the magneto-optical disk DISK is magnetized downward in advance as shown in FIG. 11A, and that the magneto-optical disk DISK is set on the rotary driving portion 1 and is in a rotatable state. In this state, part of the magnetic field generated by the permanent magnets 33' of the linear motor mechanisms 3' that are provided in the optical pickup 2' leaks out of the optical pickup 2 through the magneto-optical disk DISK to form a leakage magnetic field $H_L'$, which is generally downward and perpendicular to the data recording surface and covers the region where the external magnetic field generating device 5 is provided.

Figure 11B:
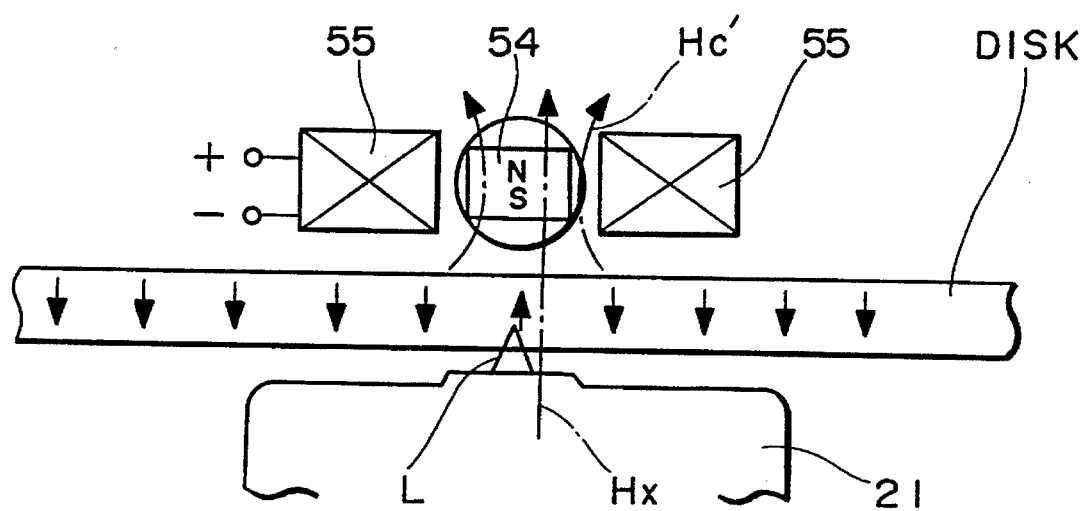

On the other hand, in the external magnetic field generating device 5, when the magnetic field reversing coil 55 is energized in one direction as shown in FIG. 11B, a magnetic field $H_C$ that is stronger than and opposite in direction to the leakage magnetic field $H_L'$ and that is upward and perpendicular to the data recording surface of the magneto-optical disk DISK is generated. Influenced by the magnetic field $H_C$ that is stronger than the leakage magnetic field $H_L'$, poles S and N of the external magnetic field generating permanent magnet 54 are oriented vertically with pole S facing the data recording surface. Thus, an upward external magnetic field $H_X$ generated by the permanent magnet 54 is applied to the data recording surface perpendicularly thereto.

In this state, in the optical pickup 2', when the coils 34 of the linear motor mechanisms 3 are supplied with a prescribed current, the linear motor action causes the optical head 21 to move along the guide rails 22 to reach a prescribed radial position of the magneto-optical disk DISK. At this position, the optical head 21 focuses laser light L and applies it to the surface of the magneto-optical disk DISK, so that at the illuminated portion the magnetization direction is changed to the upward direction by the external magnetic field $H_X$. Thus, data can be recorded onto the magneto-optical disk DISK.

When the energizing of the magnetic field reversing coil 55 is stopped, only the leakage magnetic field $H_L'$ remains. Therefore, as shown in FIG. 11A, the leakage magnetic field $H_L'$ causes the external magnetic field generating permanent magnet 54 to make a half rotation with the shafts 56a serving as the rotation axis so that poles S and N of the permanent magnet 54 are oriented vertically with pole N facing the data recording surface of the magneto-optical disk DISK. That is, an external magnetic field $H_X$ for causing downward magnetization is applied to the magneto-optical disk DISK by the external magnetic field generating permanent magnet 54. In this state, if the optical head 21 is moved by the linear motor mechanisms 3' to a position where data is recorded (the magnetization direction is upward) and then applies laser light L to that portion, the magnetization direction at that portion is changed to the downward direction, that is, data is erased from the magneto-optical disk DISK.

In summary, in the external magnetic field generating usually device 5, the magnetic field reversing coil 55 is not energized and therefore the external magnetic field generating permanent magnet 54 is normally in a position for data erasure. Only during data recording, the magnetic field reversing coil 55 is energized to cause the external magnetic field generating permanent magnet 54 to make a half rotation. Thus, the external magnetic field $H_X$ for data recording is generated. Since the magnetic field reversing coil 55 is energized only during data recording and in general the ratio of an accumulated data recording time to a total operating time of the magneto-optical disk apparatus is less than 0.5, the power consumption in the magnetic field reversing coil 55, i.e., in the external magnetic field generating device 5, can be reduced to less than ½ of that of the conventional apparatus (the magnetic field reversing coil is always energized). As a result, heat generation in the magnetic field reversing coil 55 can be suppressed, and therefore the structure for reducing the temperature can be simplified or even omitted.

In the above configuration, the magnetic field reversing coil 55 needs to be energized to rotate the external magnetic field generating permanent magnet 54 by 180°. However, since usually the leakage magnetic field $H_L'$ of the permanent magnets 33' is weak, the magnetic field $H_C'$, stronger than the leakage magnetic field $H_L'$, can be generated by supplying a very small current to the magnetic field reversing coil 55, and the external magnetic field generating permanent magnet 54 can be rotated thereby. Therefore, the power consumption of the magnetic field reversing coil 55 is further reduced.

Although in the above embodiments linear motor mechanisms 3 (or 3')are used to drive the optical head 21 of the optical pickup 2 (or 2'), the invention is not limited to such a case. Any means of driving the optical head by using magnetic force can be employed as long as part of a driving magnetic field leaks to cover the external magnetic field generating device 5.

If the orientation of poles S and N of the respective permanent magnets 33 (or 33') are reversed from the cases of the above embodiments, the direction of the leakage magnetic field $H_L$ (or $H_L'$) is also reversed. In this case, the recording and erasing operations may be performed with the orientation of the external magnetic field generating permanent magnet 55 reversed from the cases of the above embodiments.

What is claimed is:

1. A magneto-optical disk apparatus for recording and erasing data onto and from a magneto-optical disk that stores data by magnetization perpendicular to a data recording surface thereof, comprising:

an optical pickup including an optical head and a magnetic driving mechanism for moving the optical head along a radial direction of the magneto-optical disk; and an external magnetic field generating device for applying, to the magneto-optical disk, an external magnetic field perpendicular to the data recording surface, the external magnetic field generating device including:

a rotatably mounted permanent magnet which is oriented in a predetermined direction by a leakage magnetic field of the magnetic driving mechanism; and means for generating a magnetic field for changing the orientation of the rotatably mounted permanent magnet.

2. The magneto-optical disk apparatus of claim 1, wherein the rotatably mounted permanent magnet is oriented such that a permanent magnetization thereof is directed parallel to the data recording surface by the leakage magnetic field which is generally parallel with the data recording surface, and wherein the magnetic field generating means selectively generates first and second magnetic fields for orientating the rotatably mounted permanent magnet so that poles S and N thereof respectively face the data recording surface.

3. The magneto-optical disk apparatus of claim 2, wherein the magnetic driving mechanism comprises a linear motor mechanism including a pair of parallel, rod-shaped permanent magnets extending parallel to the radial direction of the magneto-optical disk, poles S and N of the rod-shaped permanent magnets being arranged in a horizontal direction alternately.

4. The magneto-optical disk apparatus disk of claim 1, wherein the rotatably mounted permanent magnet is oriented such that a permanent magnetization thereof is directed perpendicularly to the data recording surface by the leakage magnetic field which is generally perpendicular to the data recording surface, and wherein the magnetic field generating means generates a magnetic field for causing the rotatably mounted permanent magnet to rotate 180°.

5. The magneto-optical disk apparatus of claim 4, wherein the magnetic driving mechanism is a linear motor mechanism including a pair of parallel, rod-shaped permanent magnets that are arranged parallel with the radial direction of the magneto-optical disk, poles S and N of the rod-shaped permanent magnets being arranged in a horizontal direction so that the poles S or N are opposed to each other.

6. The magneto-optical disk apparatus of claim 1, wherein the magnetic field generating means is a coil.

7. The magneto-optical disk apparatus of claim 6, wherein the rotatably mounted permanent magnet extends along the radial direction of the magneto-optical disk over an entire radius thereof, and is rotatable on a longitudinal axis thereof.

8. The magneto-optical disk apparatus of claim 7, wherein the rotatably mounted permanent magnet has a rectangular cross-section taken perpendicularly to the longitudinal direction thereof, and poles S and N thereof exist at longer sides of the cross-section.

9. The magneto-optical disk apparatus of claim 6, wherein the coil surrounds the rotatably mounted permanent magnet in a horizontal plane.

10. The magneto-optical disk apparatus of claim 3, wherein the linear motor mechanism further includes a pair of coils, integral with said optical head, disposed adjacent to the respective rod-shaped permanent magnets and movable, when energized, along the radial direction of the magneto-optical disk.

11. The magneto-optical disk apparatus of claim 5, wherein the linear motor mechanism further includes a pair of coils, integral with said optical head, disposed adjacent to the respective rod-shaped permanent magnets and movable, when energized, along the radial direction of the magneto-optical disk.

* * * * *